United States Patent [19]

Oejelid

[11] 3,894,594

[45] July 15, 1975

[54] WEIGHT INDICATION AND WEIGHT INDICATION STORAGE MECHANISM FOR A SCALE

[75] Inventor: Göran Oejelid, Ulricehamm, Sweden

[73] Assignee: Miratron AG, Basel, Switzerland

[22] Filed: May 28, 1974

[21] Appl. No.: 473,394

[30] Foreign Application Priority Data
May 25, 1973 Switzerland.................... 7574/73

[52] U.S. Cl............... 177/211; 177/210; 324/99 R
[51] Int. Cl............................................ G01g 3/14
[58] Field of Search................ 177/173, 212–214, 177/210–211

[56] References Cited
UNITED STATES PATENTS

| | | | |
|---|---|---|---|
| 1,384,263 | 7/1921 | Larsen | 177/214 |
| 2,846,645 | 8/1958 | Ruge | 177/211 |
| 2,880,985 | 7/1959 | Roberts | 177/173 |
| 3,046,411 | 7/1962 | Steiner | 177/211 |
| 3,211,991 | 10/1965 | Potter | 177/211 |
| 3,338,323 | 8/1967 | Swersey | 177/212 |
| 3,559,059 | 1/1971 | Martin | 177/211 X |

Primary Examiner—Joseph W. Hartary
Assistant Examiner—Vit W. Miska
Attorney, Agent, or Firm—Kurt Kelman

[57] ABSTRACT

Strain gages are bonded to deformable support parts for the platform of a scale to produce signals in response to the deformation of such parts under a payload placed on the scale platform. The strain gages form two branches of a bridge circuit, the two other branches thereof being comprised of a plurality of resistances connected in parallel. Each resistance has a sliding tap connected to a first input terminal of a signal amplifier, a switch being arranged between each tap and the amplifier input, and the junction of the strain gage branches of the circuit is connected to a second input terminal of the amplifier. A motor connected to the amplifier output operates drive means for a dial indicator for indicating the weight, and a coupling connects a respective sliding tap to the drive means to drive the connected tap to a balancing position in respect of the associated resistance wherein the input signal to the amplifier is substantially zero.

1 Claim, 3 Drawing Figures

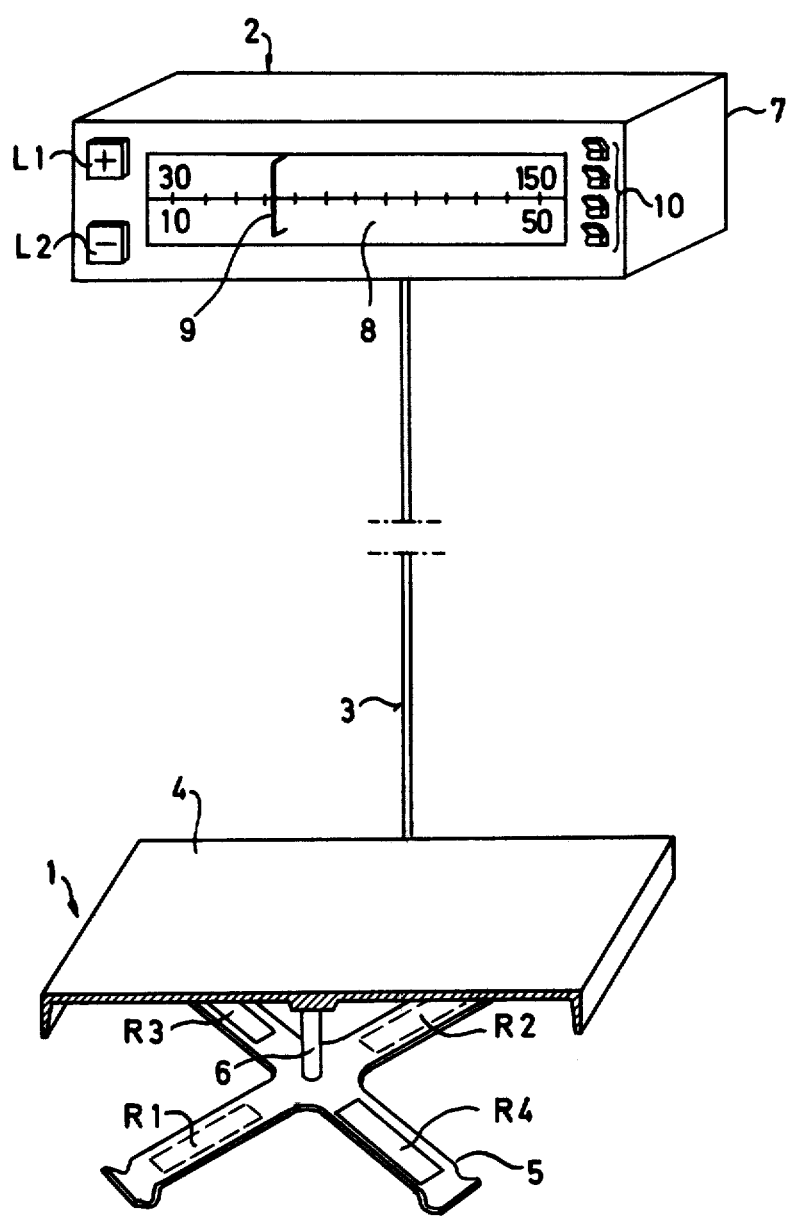

WEIGHT INDICATION AND WEIGHT INDICATION STORAGE MECHANISM FOR A SCALE

The present invention is directed to improvements in a scale which comprises a platform, a support for the platform and a central column supporting the platform on the support, the support including deformable parts and deformation of the support parts under a payload placed on the platform delivering a measuring signal corresponding to the payload.

Measuring mechanism for indicating the weight or pressure of a load are known wherein transducing means converts the deformation of selected structural parts into electrical signals constituting a measure of the respective weight or pressure to which the mechanism is subjected. Strain gages have been used as transducing means for this purpose to convert, for instance, an extension of a structural part to which the strain gage is bonded into a corresponding electrical measuring signal. Relatively simple memory circuitry makes it possible to store consecutive signals in a scale so that the weight of any particular person using the scale over a period of time may not only be indicated at each time of weighing but the stored data will also indicate whether this weight is smaller or larger than at the previous time of weighing of this particular person.

It is the object of this invention to provide a weight indication and weight indication storage mechanism for such a scale, wherein the weight measuring signal is stored for a considerable period of time even if no electric current is fed during this period to the mechanism to indicate any weight change at a subsequent weighing.

This and other objects are accomplished according to the invention with a mechanism which includes a bridge circuit having four branches. A first bridge circuit branch comprises a plurality of series-connected strain gages responsive to the deformation of a first set of support parts for the scale platform, a second bridge circuit branch comprises another plurality of series-connected strain gages responsive to the deformation of a second set of the support parts, and a third and fourth bridge circuit branch is comprised of a plurality of resistances connected in parallel. Each of the resistances has a sliding tap and one of the ends of the first and second bridge circuit branches form a junction while the other end of the first and second bridge circuit branches are connected to respective ends of the third and fourth bridge circuit branches. A signal amplifier has a first input terminal connected to each of the sliding taps, with a switch element in each circuit connection between the sliding taps and the first input terminal, and a second input terminal connected to the junction between the first and second bridge circuit branches. A motor is connected to the signal output of the amplifier and is operated by the output signal therefrom. The indicator of a dial for indicating weight is connected to, and operated by, drives means connected to, and operated by, the motor, and a coupling connects a respective one of the sliding taps to the drive means. The connected sliding tap is moved by the drive means to a balancing position in respect of the resistance associated therewith wherein the input signal to the amplifier is substantially zero.

The above and other objects and features of the present invention will become more apparent from the following detailed description of a now preferred embodiment thereof, taken in conjunction with the accompanying drawing wherein FIG. 1 is a schematic perspective view of the weighing platform of a scale, partly in section, and a weight indication and weight indication storage mechanism mountable independently of the scale platform and connected to the platform support by an electric cable;

Figure 3:
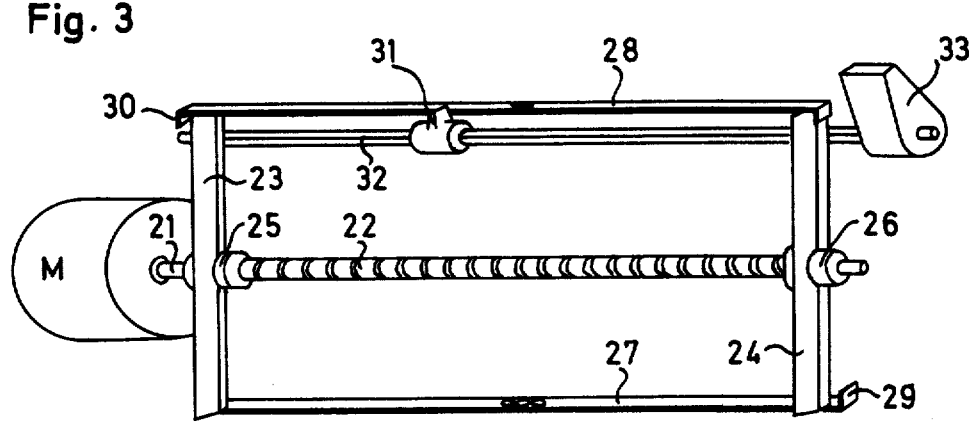
FIG. 3 is a schematic perspective view of the indicating and storing work of the mechanism, with a single storage arrangement.

Referring now to the drawing and first to FIG. 1, the scale is indicated by 1, the weight indication and weight indication storage mechanism by 2 and the connecting cable between the scale and the mechanism by 3. As shown, the scale comprises platform 4 whereon a person may stand to be weighed, support 5 and central column 6 supporting the platform on the support. The support consists of a cross-shaped piece of steel sheet or plate whose four parts are deformable under a payload placed on platform 4. Respective strain gages R1, R2, R3 and R4 are bonded to the deformable support parts for delivering a measuring signal corresponding to the weight of the payload on platform 4. A first pair of strain gages R1, R2 are bonded to the underside of the support parts extending in one diametrical direction while another pair of strain gages R3, R4 are bonded to the top side of the other support parts extending in another diametrical direction. When a payload is placed on platform 4, the support parts, which rest on the floor or another stationary surface, are deformed under the load. This changes the resistance of the four strain gages which constitute two pairs of series-connected strain gages, producing a corresponding weight measuring signal.

Housing 7 for weight indication and weight indication storage mechanism 2 carries graduated scale or dial 8 with cooperating indicator 9, two scales being provided for respective weight ranges, means being provided for switching from one to the other dial scale. A plurality of selection switches 10 are mounted on the housing, each selection switch being assigned to a particular person using the scale, the illustrated embodiment being designed for the use by four persons, with four selection switches and four slidable taps in a bridge circuit to be described hereinafter. The person using the scale will operate the selection switch assigned to him or her and signal lamps L1, L2 on housing 7 will indicate whether he or she has lost or gained weight since the last weighing, lamp L1 lighting up in case of a weight gain and lamp L2 being energized in case of a weight loss.

Figure 2:
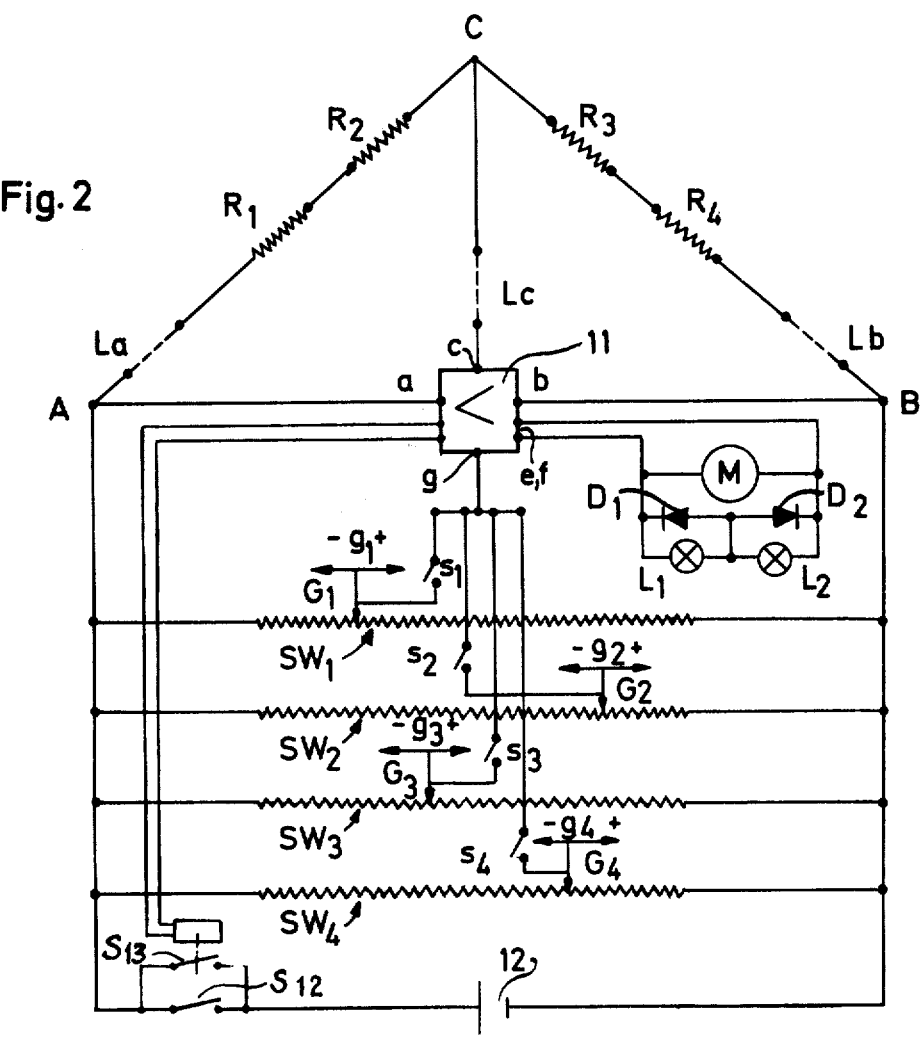
FIG. 2 is a circuit diagram for the mechanism according to this invention.

FIG. 2 illustrates the bridge circuit for the mechanism of the invention. As shown, the circuit has four branches. A first bridge circuit branch comprises series-connected strain gages R1, R2 and a second branch comprises series-connected strain gages R3, R4, the strain gages being responsive to the deformation of a respective set of platform support parts, as described hereinabove in connection with FIG. 1. A third and fourth bridge circuit branch is comprised of four resistances SW1, SW2, SW3, SW4 of equal magnitude and connected in parallel. A sliding tap or contact G1, G2, G3, G4 is associated with each resistance. Portions $L_a$ and $L_b$ in the first and second branches, and portion $L_c$ in the diagonal part C–c (all shown in broken lines) represent connecting cable 3 of FIG. 1.

Signal amplifier 11 is connected to diagonal C–c. One of the ends of the first and second bridge circuit branches forms junction C while the other end A and B thereof is connected to respective ends of the third and fourth bridge circuit branches. Each sliding tap G1, G2, G3, G4 is connected to first input terminal g of amplifier 11 and a switch element S1, S2, S3, S4 is arranged in the circuit connection of each tap to the amplifier input terminal. A respective one of the switch elements is operated by a respective selection switch 10 so that each person may activate the resistance SW1, SW2, SW3, SW4 assigned to him or her. Junction C is connected to second input terminal c of the amplifier. Electric current is delivered to amplifier 11 from current source 12, such as a storage battery or a connection to an electrical current supply grid, through terminals A and B of the bridge circuit, these circuit terminals being connected to amplifier terminals a and b.

The signal output of amplifier 11 comprises output terminals e, f connected to a drive and signaling system operated by the output signal of the amplifier, this system including motor M, the two signaling lamps L1 and L2, and two diodes D1 and D2 connected in parallel to the amplifier output.

As will appear more clearly from FIG. 3 to be described hereinafter, motor M drives entrainment means (not shown in FIG. 2) for moving a respective one of sliding taps G1, G2, G3, G4 along its associated resistance SW1, SW2, SW3, SW4 in either direction, right or left, as indicated by double-headed arrows $-g_1+$, $-g_2+$, $-g_3+$, $-g_4+$, the tap to be moved being selected by coupling the selected tap to the entrainment means at the time of weighing. Coupling of the tap closes the switch element S1, S2, S3, S4 associated therewith and thus connects a selected resistance SW1, SW2, SW3, SW4 to input terminal g of amplifier 11. This causes simultaneous closing of the current supply circuit to battery 12 to deliver current to the amplifier.

Amplifier 11 is arranged in a manner not illustrated herein to deliver a voltage to motor M to drive the entrainment means back to its rest position after the weighing has been completed and the respective switch element S1, S2, S3, S4 has been opened. This is accomplished by keeping switch S13 in the electric current supply circuit closed even after switch S12 is opened until the entrainment means has reached its end or rest position.

Assuming the bridge circuit is in disequilibrium or unbalance after the selected sliding tap is in circuit with the amplifier, amplifier 11 will deliver an output signal at terminals e, f to rotate the motor to the right or left. This will cause the entrainment means to move the tap to the left (−) or to the right (+) until the circuit has been balanced, i.e., the tap is in a balancing position in respect of its associated resistance wherein the input signal to the amplifier is substantially zero. Depending on the direction of rotation of motor M, i.e., according to the polarity of the control signal, lamp L1 or L2 will be energized to light up and show a weight gain or loss. Since diodes D1, D2 are connected in parallel, the other lamp will not be energized and remains dark. After the circuit has been balanced, the weighing operation is completed and the coupling between motor M and the entrainment means in disconnected, for instance simply by letting go an actuating lever (see FIG. 3) which causes closing of electric supply circuit switch S12 and one of the switch elements S1, S2, S3, S4. The scale is now ready for another weighing operation, and the previous weight measuring signal has been stored in the respective resistance SW1, SW2, SW3, SW4.

The indicating and storing work of the mechanism has been schematically illustrated in FIG. 3 which, for a clearer understanding, shows only those structural parts essential for the operation at each weighing. Thus, for the sake of clarity, bearing and guide means have been omitted from the drawing.

Referring now to FIG. 3, output shaft 21 of motor M is coupled to threaded spindle 22 for rotating the same in one or the other direction. Internally threaded nuts 25, 26 are mounted on the threaded spindle for movement therealong in response to the rotation of the spindle, each nut carrying a respective member 23, 24. The two movable members are shown in FIG. 3 at or near their respective rest or end positions on spindle 22. Tie bars 27, 28, are associated with movable members 23, 24, the ends of each tie bar carrying hooks 29, 30 for engagement with the movable members 23, 24. The tie bars are mounted in guideways (not shown) for sliding movement therein so that, when one movable member has reached its end position, the other movable member will be guided onto the thread of the spindle. Movable members 23, 24 serve not only for entrainment of dial indicator 9 (see FIG. 1) but also for driving taps G1, G2, G3, G4 along resistances SW1, SW2, SW3, SW4 when coupled thereto by coupling 31. The coupling is brought into the path of movement of members 23, 24 by pivoting control shaft 32 carrying coupling 32, which also causes closing of switch element S1, S2, S3, S4 and switch S12 in a manner not shown. Switch button 33 corresponds to one of selection switches 10 shown in FIG. 1.

The above-described mechanism operates in a manner partly obvious from the description of the structure and more fully elucidated hereinbelow.

Assuming the person weighing himself or herself has gained weight since the last weighing and the tap assigned to this person is to be moved to the right along its associated resistance, amplifier 11 will deliver a voltage signal of such polarity to motor M that spindle 22 will entrain the movable member 23 from the left to the right. This rightward movement of member 23 will continue until this member is engaged by coupling 31 associated with this tap and the connected sliding tap will then be moved into a new balancing position in respect of its associated resistance.

After the weighing has been completed, the person will release switch button 33, which was operated to initiate the weighing operation and to energize the tap and resistance assigned to this person, which release will open the associated switch element S1, S2, S3, S4, thus disconnecting the tap from amplifier 11. However, as hereinabove described, motor M will automatically continue to receive a voltage from amplifier 11 to enable movable member 23 to return leftwards to its rest or end position. When member 23 has reached its end position, switch S13 in the electric current supply circuit will be opened to discontinue the voltage supply to the motor, opening of switch S13 being effected by a limit switch (not shown) energized in response to the position of tie bars 27, 28.

If the next weighing operation requires a leftward move of the selected tap along its resistance, movable member 23 is moved all the way to the left to cause the ties bars 27, 28, whose end hooks 30 are engaged by member 23, to pull movable member 24, engaged by end hooks 29 of the tie bars, onto the thread of spindle 22. Rotation of the spindle then causes member 24 to be moved further to the left in response to the rotation of the spindle by motor M. This movement ceases when the selected tap is in the balancing position in respect of its associated resistance.

While four signal storage resistances with their associated sliding taps have been illustrated, any number of such storage circuits may be provided, a selected tap being coupled to one of the movable members 23, 24. In any case, the storage of the last received weight measuring signal in the selected resistance will be maintained for an indefinite time period, regardless of the absence of a voltage.

The measuring range may be changed by connecting resistances in series with the variable resistances SW1, SW2, SW3, SW4 so that it is possible to read two or more weight ranges from the graduated scale or dial. Assuming there is space in the housing, the mechanism may be enlarged at any time for use by additional persons simply by adding additional storage circuits to the third and fourth branches of the bridge circuit. The installation of such additional circuits will be facilitated if an additional switch element (not shown) is arranged in each electrical connection to variable resistance SW1, SW2, SW3, SW4, the additional switch element being energized and de-energized with the associated switch element S1, S2, S3, S4. This avoids complications in rebalancing the bridge circuit, due to the additional resistances connected in parallel with the existing resistances.

The dial and the variable resistances may be rectilinear or arcuate. Also, instead of the two signaling lamps, the dial may be internally illuminated, for instance in red and green, to give a visible signal of weight loss or gain. Furthermore, the coupling between the sliding tap and the movable members 23, 24 may be automatically disconnected after each weighing and the switching elements S1, S2, S3, S4 as well as switch S12 may be simultaneously de-energized by a suitable return spring. It will be useful to mark switch buttons 33 of selection switches 10 clearly, for instance by color, to enable each person to actuate the switch and corresponding weight indicating and storage circuit assigned to him or her.

What is claimed is:

1. A weight indication and weight indication storage mechanism for a scale comprising a platform, a support for the platform and a central column supporting the platform on the support, the support including deformable parts and deformation of the support parts under a payload placed on the platform delivering a measuring signal corresponding to the weight of the payload, the mechanism including
   1. a bridge circuit having four branches,
      a. a first bridge circuit branch comprising a plurality of series-connected strain gages responsive to the deformation of a first set of the support parts,
      b. a second bridge circuit branch comprising another plurality of series-connected strain gages responsive to the deformation of a second set of the support parts, and
      c. a third and fourth bridge circuit branch comprised of a plurality of resistances connected in parallel, each of the resistances having a sliding tap, one of the ends of the first and second bridge circuit branches forming a junction and the other end of the first and second bridge circuit branches being connected to respective ends of the third and fourth bridge circuit branches,
   2. a signal amplifier having two input terminals and a signal output,
      a. a circuit connection between each of the sliding taps and a first input terminal of the amplifier,
      b. a switch element in each of the circuit connections, and
      c. a circuit connection between the junction of the first and second bridge circuit branches and a second input terminal of the amplifier,
   3. a motor connected to the signal output of the amplifier and operated by the output signal therefrom,
   4. drive means comprising a threaded spindle connected to the motor and two members mounted for movement on and along the spindle, the two members being alternatively engaged by the threaded spindle, and the drive means being operated by the motor,
   5. a dial with an indicator for indicating weight,
      a. the dial indicator being connected to, and operated by, the drive means, and
   6. a coupling for connecting a respective one of the sliding tapes to the drive means,
      a. the connected sliding tap being moved by the drive means to a balancing position in respect of the resistance associated therewith wherein the input signal to the amplifier is substantially zero.

* * * * *